United States Patent

[11] 3,571,707

[72] Inventor Walter H. Houck
 Titusville, Fla.
[21] Appl. No. 817,482
[22] Filed Apr. 18, 1969
[45] Patented Mar. 23, 1971
[73] Assignee The United States of America as represented by the Administrator of the National Aeronautics and Space Administration

[54] VOLTAGE DROPOUT SENSOR
 6 Claims, 1 Drawing Fig.
[52] U.S. Cl. ................................................. 324/107,
 324/103, 324/133, 340/248
[51] Int. Cl. ....................................................... G01r 19/00,
 G01r 19/16, G08b 21/00
[50] Field of Search........................................... 324/107,
 133, 103, 102; 317/31, 33, 148.5; 340/248, 248
 (B), 248 (C), 252, 253, 253 (A)

[56] References Cited
UNITED STATES PATENTS

| | | | |
|---|---|---|---|
| 3,343,036 | 9/1967 | Steen...... | 317/31 |
| 3,388,296 | 6/1968 | Tenenbaum et al. ......... | 317/33X |
| 3,389,303 | 6/1968 | Tenenbaum.................. | 317/33X |
| 3,389,325 | 6/1968 | Gilbert ......................... | 317/31X |
| 3,407,338 | 10/1968 | Secunde ....................... | 317/31X |
| 3,434,011 | 3/1969 | Zocholl ........................ | 317/33 |
| 3,465,206 | 9/1969 | Harker et al. ................. | 317/33X |

*Primary Examiner* — Rudolph V. Rolinec
*Attorneys* — James O. Harrell and G. T. McCoy

ABSTRACT: A system for monitoring the output voltage of a power source for generating a signal indicating when the amplitude level of the voltage drops below a predetermined value. The system is provided with a summing circuit so that multiphase voltages can be monitored.

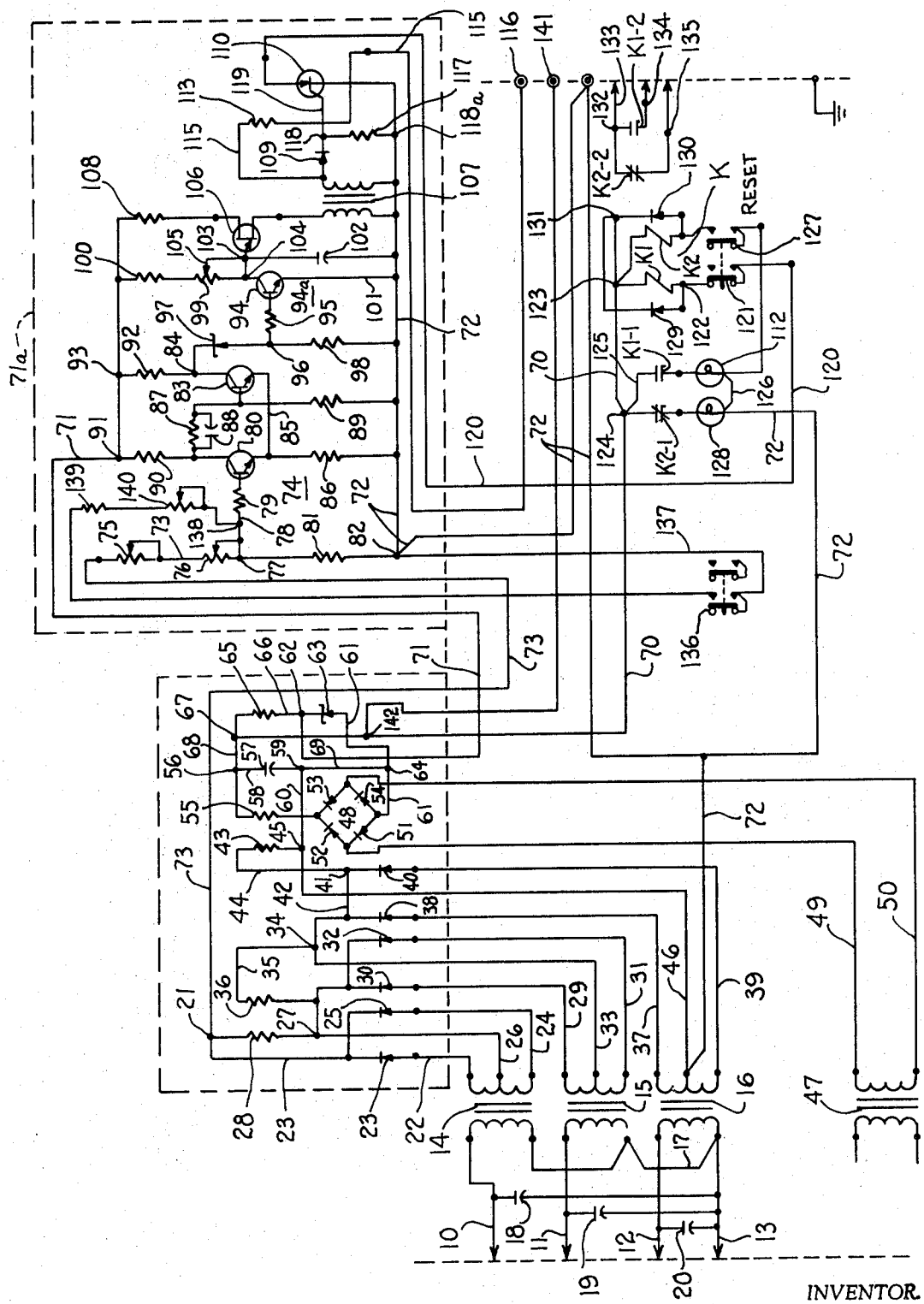

VOLTAGE DROPOUT SENSOR

This invention described herein was made by an employee of the United States Government, and may be manufactured and used by or for the Government for Governmental purposes without the payment of any royalties thereon or therefor.

This invention relates to a system for monitoring a voltage source and more particularly, to a system for monitoring a multiphase voltage source for indicating when the level of the voltage drops below a predetermined amplitude.

One of the problems encountered in using computers is determining the cause of malfunctions. That is, the malfunction could be caused by the computer itself or by failure of the power being supplied to the computer. In order to isolate such problems the circuit constructed in accordance with the present invention is connected to the input power source to monitor such to determine if there are any variations in the normal input voltage level. For example, if it is desired to maintain a three-phase 208 volt voltage on the input of the computer, the sensor when connected to the power source would cause an indicator light to be illuminated when the voltage level dropped below the desired predetermined value of 208 volts. Before the light could be extinguished the circuit would have to be manually reset. In other words, if there were a temporary power failure which could possibly cause a loss of information or incorrect information to be stored in the computer, notice of such a failure would be conveyed to the operator by the sensor.

The circuit is also adapted to be plugged into other equipment such as tape recorders, counters, etc., so as to make a permanent record of the deviations below the desired voltage level.

In accordance with the present invention, it has been found that difficulties encountered with the line voltage deviating from the desired voltage level may be overcome by providing a novel voltage sensor system. This sensor system, when used for monitoring a multiphase alternating voltage to indicate when the amptitude level of the voltage drops below a predetermined value, includes the following basic parts: (1) a summing circuit means coupled to the multiphase voltage for totalizing the voltages of each phase producing an alternating composite signal, (2) a trigger circuit means having an input to which the composite signal is coupled which generates an alternating signal having a frequency corresponding to the amptitude of the composite signal, (3) an electronic switching means coupled to the trigger circuit which conducts during one-half of each cycle of said alternating signal and is cut off during the other half cycle of the alternating signal, (4) a capacitor coupled to the switching means for being charged when the electronic switching means is conducting and discharges when the switching means is cut off, (5) an electronic pulse forming circuit coupled to the capacitor for producing a pulse responsive to the capacitor charging to a predetermined level indicating that the amptitude of the multiphase alternating voltage has dropped below a predetermined level, and (6) an indicator means coupled to the pulse forming means for being activated responsive to the amptitude of the multiphase voltage dropping below a predetermined level.

Accordingly, it is an important object of the present invention to provide a voltage sensor which produces an indication when the level of the voltage being monitored drops below a predetermined value.

Another important object of the present invention is to provide a voltage sensor which is capable of monitoring a multiphase voltage source and generates a signal when any one of the phases drops below a predetermined value.

Still another important object of the present invention is to provide a voltage sensor which does not require the power being supplied to be cut off in order to reset the sensor to an operating condition.

Still a further important object of the present invention is to provide a simple and economical voltage sensor for monitoring voltages.

Other objects and advantages of this invention will become more apparent from a reading of the following detailed description and appended claims taken in conjunction with the accompanying drawing wherein:

FIG. 1 is a schematic diagram showing the voltage sensor system.

Referring in more detail to the drawing, a schematic diagram of the voltage sensor is illustrated which is connected to a voltage source (not shown) that is to be monitored. For purpose of clarity, a three-phase 208 volt voltage is used and is applied to the input leads 10, 11 and 12, respectively, which are, in turn, connected to the primary winding of step down transformers 14, 15 and 16, respectively. The input lead 13 is a neutral lead and, therefore, is connected by lead 17 to one side of the input winding of each of the transformers 14, 15 and 16. As previously mentioned, the other side of the input windings are connected to the input leads 10, 11 and 12, respectively. Filter capacitors 18, 19 and 20 are connected between each of the input leads 10, 11 and 12, respectively, and the neutral lead 13 for filtering out any RF signals that may be present. Each phase of the three-phase input alternating voltage is applied to a respective primary winding of a transformer 14, 15 and 16. The transformers 14, 15 and 16 stepdown the line voltage being monitored so that there are approximately 10volts on each of the output windings of the transformers 14, 15 and 16, respectively. These 10 volt signals are applied through a respective diode rectifier and are added algebraically to give a sum of approximately 10 volts at a summing point 21 with a ripple voltage of about nine-tenths of a volt peak to peak at 360 Hertz per second.

One side of the secondary winding of transformer 14 is connected through lead 22, a rectifying diode 23, to a summing point 21, while the other side of the secondary winding 14 is connected to the diode 25, lead 23, to the summing point 21. A common lead 26 is connected between a center tap on the output winding of transformer 14 and a junction point 27. A summing resistor 28 is connected between the junction 27 and the summing point 21.

One side of the secondary winding of transformer 15 is connected by lead 29 to a rectifying diode 30, to junction 27 which is, in turn, connected to the summing point 21. The other side of the secondary winding of transformer 15 is connected by means of lead 31 through rectifying diode 32 to the same junction 27 and the summing point 21. The common lead 33 is connected between a center tap on the secondary winding of transformer 15 and junction 34 which is, in turn, connected through lead 35 to a summing resistor 36. The other side of the summing resistor 36 is connected to junction 27 which is, in turn, coupled through summing resistor 28 to the summing point 21.

One end of the secondary winding of transformer 16 is coupled by lead 37 to a rectifying diode 38 to junction 34. The other end of the secondary winding of transformer 16 is coupled by lead 39 through the rectifying diode 40 to junction 41. It is noted that junction 41 is coupled to junction 34 by means of lead 42. Junction 41 is also connected to summing resistor 43 through lead 44. The other side of the summing resistor 43 is connected to junction 45 which is, in turn, connected to common lead 46 which has its other end connected to the center tap of the secondary winding of transformer 16. Each of the rectifying diodes 23, 25, 30, 32, 38 and 40 has its anode facing the secondary winding of the transformer 14, 15 and 16.

A 115 volt AC source is provided for acting as a power supply for the components of the voltage sensor. This 115 volt source is connected to the primary winding of step down transformer 47. The secondary winding of the step down transformer 47 is coupled to the input of a full wave bridge rectifier 48 by means of leads 49 and 50. The full wave bridge rectifier 48 includes four branches, each branch having a diode 51, 52, 53 and 54, respectively, interposed therein. Resistor 55 is connected to one side of the full wave rectifier between diodes 52 and 53 and junction 56. A capacitor 57 is interposed in lead 58 between junction 56 and junction 59. Junction 59 is, in turn, connected to the junction 45 by lead 60. The resistor 55 and the capacitor 56 form a filter network for the output of the rectifier 48. The other side of the full wave rectifier 48 is connected by lead 61 to junction 62. A Zener diode 63 is connected between junction 62 and a junction 64 interposed in lead 61 for maintaining the output voltage of the rectifier 48 at approximately 20 volts. A regulating resistor 65 is interposed in lead 66 between junction 62 and junction 67. Junction 67 is, in turn, connected to junction 56 via lead 68. It is noted that the cathode terminal of the Zener diode 63 faces junction 62, while the anode faces junction 64. Junction 59 is connected to junction 64 via lead 69. There are two output circuits from the rectifier 48. One is a 28 volt DC signal which is supplied over lead 70 to power the relays and indicator lamps which will be discussed more fully below. The second output is taken off at junction 62 and regulated by the Zener diode 63 to produce a regulated output of approximately 20 volts DC on lead 71. This signal is used to power the equipment shown on circuit-board enclosed by the broken line 71a.

A common lead 72 is connected to the center tap of transformer 16 and provides a return path for the signals flowing through the circuit.

The signal from the summing point 21 is fed by the lead 73 to the input of a trigger circuit generally designated at 74. The signal flowing from the summing point 21 into the trigger circuit is sometimes referred to as the composite signal and is fed through variable resistors 75 and 76, which are provided for calibrating the trigger circuit. The other side of variable resistor 76 is connected to junction 77 which, in turn, is connected through lead 78, resistor 79, to the base electrode of transistor 80. An input load resistor 81 is connected between junction 77 and junction 82 interposed in common lead 72.

The trigger circuit includes a pair of NPN transistors 80 and 83, which conduct alternately when a normal signal of 10 volts is present on the base of transistor 80. The trigger circuit will change state as the ripple voltage of the composite signal from the summing point 21 swings above the 10 volt DC level, and will reset as the ripple voltage swings down towards the 10 volt DC level. In other words, when the normal signal is present at the input of the trigger circuit, a near symmetrical square wave will appear at the junction 84, the output of the trigger circuit. The frequency of the square wave signal is determined by the amplitude of the signal at summing point 21. When the composite signal from the summing point drops below a predetermined level, the trigger circuit (80, 83) stops switching back and forth. The resistors 75 and 76 are provided for calibrating the trigger circuit so that the trigger circuit will cut off when the composite signal drops below the predetermined level. The trigger circuit is a conventional Schmidt's trigger circuit.

The emitter electrodes of the transistors 80 and 83 are joined together through lead 85, and are connected to the common lead 72 through resistor 86.

The collector electrode of transistor 80 is connected to the base electrode of transistor 83 through an RC coupling network which includes resistor 87 and a parallel capacitor 88. The base electrode of transistor 83 is also connected to the common lead 72 through a load resistor 89. A decoupling resistor 90 is connected between the collector electrode of transistor 80 and junction 91 interposed in lead 71 which has the 20 volt regulated signal interposed thereon. A similar decoupling resistor 92 is connected between junction 84 and junction 93 interposed in lead 71.

The output of the trigger circuit is fed to an electronic switching means, generally designated by the reference character 94a which is alternately placed in the conducting and nonconducting state at the frequency of the alternating square wave signal being fed thereto.

The electronic switching means includes a NPN transistor 94 which has its base electrode connected through resistor 95 to junction 96. The output of the trigger circuit 94a is taken at junction 84 which is coupled to junction 96 through a Zener diode 97 which prevents voltages from the base electrode of transistor 94 from getting back to transistor 83. In other words, the Zener diode 97 acts as a decoupler and also provides a bias for the base electrode of transistor 94. A load resistor 98 is connected between junction 96 and common lead 72. The collector electrode of transistor 94 is coupled through a calibrating variable resistor 99 and a dropping resistor 100 to lead 71, which has the 20 volt potential thereon. The emitter electrode is coupled directly to the common lead 72 via lead 101. A shorting capacitor 102 is connected between common lead 72 and junction 103 which is, in turn, coupled to junction 104 interposed in the collector circuit of transistor 94. Junction 103 is also connected to the wiper arm 105 of the variable resistor 99.

The emitter electrode of a unijunctional transistor 106 is coupled to junction 103 so that if capacitor 102 is charged above a predetermined level it will begin conducting. The level at which capacitor 102 is charged is controlled by the frequency that transistor 94 is switched from the conducting to the nonconducting state. The unijunctional transistor 106 and a pulse transformer 107 form part of the electronic pulse forming circuit. It is noted that the first and second base electrodes of the unijunctional transistor 106 are connected in series with the primary winding of transformer 107 between leads 71 and 72.

When transformer 106 begins conducting current flows from lead 71 through dropping resistor 108, transistor 106, and through the primary winding of transformer 107 to the common lead 72. This causes a pulse to be placed on the secondary of transformer 107 which is fed through a diode 109 to a gate electrode of a silicon controlled rectifier 110 to fire rectifier 110. When rectifier 110 is energized a relay 111 is energized causing lamp 112 to be illuminated indicating that the voltage being monitored dropped below a predetermined level.

A decoupling resistor 113 is also connected to the secondary winding of transformer 107 through junction 114 and lead 115. The other end of lead 115 is connected to a jack 116 for providing an output of pulse from the sensor if one is desired. A load resistor 117 is connected between junction 118 interposed in lead 119 which extends between the secondary winding of transformer 107 and the control electrode of the silicon controlled rectifier 110 and junction 118a.

When the silicon controlled rectifier 110 fires a signal is supplied over lead 120 to the relay K through contact 121 of a reset pushbutton, junction 122, coil K1 of the latching relay K, to junction 123 interposed in lead 70. This causes the normally closed contact K1-1 to be closed energizing lamp 112. It is noted that the closing of contact K1-1 closes the circuit extending from junction 124, lead 125, lamp 112, jumper lead 126, to the common lead 72. Lamp 112 remains illuminated until the circuit is manually reset. It is noted that the anode electrode of rectifier 110 is connected to lead 120, while the cathode is connected to lead 72.

The circuit is manually reset by pushing the reset button causing contact 127 to close energizing the latching relay coil K2 which is interposed in a circuit extending between junction 123 and the pushbutton 127. When the latching relay coil K2 is energized, coil K1 is deenergized, therefore, normally closed contact K2-1 is again closed energizing lamp 128 which indicates that the voltage is above the desired level. When the reset button is pushed normally open contact K1-1 is again opened deenergizing the lamp 112. Relay suppressor diodes 129 and 130 are coupled in shunt with the coils K1 and K2, respectively, to a junction 131 for preventing the relay coil signals from getting to other parts of the circuit.

A remote outlet which includes normally closed contact K2-2 and normally open contact K1-2 is provided for connecting to a remote circuit to indicate which relay coil K1 or K2 is energized. When coil K1 is energized the normally open contact K1-2 forms a closed circuit between junction 132 interposed in lead 133 and junction 134 to which a jack can be coupled. When relay coil K2 is energized the normally closed contact K2-2 remains closed maintaining a completed circuit between junction 132 and junction 135.

When is is desired to test the voltage sensor in order to determine if such would operate properly if the voltage level dropped below a predetermined value, a test switch 136 is interposed in lead 137 which extends from junction 82 to junction 138 interposed in lead 78 which is, in turn, coupled to the base electrode of transistor 80. Calibrating resistors 139 and 140 are also interposed in the lead. By depressing the test button 136 some of the signal from the summing point 21 is shunted through the calibrating resistor 139 and 140 simulating a low voltage being supplied to the trigger circuit.

An auxiliary power input lead extends between jack 141 and junction 142 for supplying a 28 volt auxiliary signal, if it is not desirable to use the 115 volt AC being supplied to transformer 47.

In summarizing the operation of the voltage sensor, each phase of the three-phase voltage being monitored is connected to a respective primary winding of the transformers 14, 15 and 16. These transformers step down the input voltage to approximately 10 volts and feed such through rectifiers and summing resistors to a summing point 21. Under normal operation the voltage level at the summing point should be approximately 10 volts with the ripple voltage swinging above the 10 volt level. The 10 volt signal at summing point 21 which is to be monitored, is fed through resistors 75 and 76 to the base electrode of transistor 80 which forms part of a trigger circuit. The transistors 80 and 83 which form the heart of the trigger circuit are alternately placed in a conducting and nonconducting state at a predetermined frequency. In one particular example, this is 360 Hertz per second. When the line voltage is normal the output of the trigger circuit at junction 84 is a near symmetrical alternating square wave signal. This square wave signal causes transistor 94 which forms part of the electronic switching means to be placed in a conducting and nonconducting state at the rate of the frequency of the alternating signal. As long as the frequency at which the transistor 94 is turned on and off is above a predetermined level and near symmetrical, capacitor 102 does not charge to a value which would cause the unijunction transistor 106 to fire. However, when the voltage level of the source being monitored drops below a predetermined value, the trigger circuit which includes transistors 80 and 83 stops switching back and forth. This in turn, causes the switching transistor 94 to remain off. This enables capacitor 102 to charge to a level which causes the unijunctional transistor 106 to fire. As such fires a pulse is fed through transformer 107 to fire the silicon controlled rectifier producing a pulse which energizes coil K1 of the latching relay K to illuminate lamp 112. This indicates that the voltage level dropped below a predetermined desired level. In order to reset the circuit, reset contact 121 is depressed energizing relay coil K1 which, in turn, causes lamp 128 to be illuminated and lamp 112 to be extinguished, indicating that the voltage level is now within the proper range.

While a preferred embodiment of the invention has been described using specific terms, such description is for illustrative purposes only, and it is to be understood that changes and variations may be made without departing from the spirit and scope of the following claims:

I claim:

1. A voltage sensor for monitoring a multiphase alternating voltage having an undetermined amplitude level to indicate when the amplitude level of said voltage drops below a predetermined value comprising:

A. means for rectifying said multiphase alternating voltage;

B. a summing circuit means coupled to said means for rectifying said multiphase alternating voltage for totalizing the voltages of each phase producing a composite signal having a ripple voltage corresponding to the amplitude of said composite signal;

C. a trigger circuit means having an input to which said composite signal is coupled, said trigger circuit means generating an alternating signal having a frequency corresponding to said ripple voltage of said composite signal when said composite signal exceeds a predetermined value;

D. an electronic switching means coupled to said trigger circuit which conducts during one-half of each cycle of said alternating signal and is cut off during the other half of each cycle of said alternating signal;

E. a capacitor coupled to said switching means for being charged when said electronic switching means is conducting and discharges when said switching means is not conducting;

F. an electronic pulse forming circuit coupled to said capacitor for producing a pulse responsive to said capacitor charging to a predetermined level indicating that said amplitude of said multiphase alternating voltage has dropped below a predetermined level; and G. an indicator means coupled to said pulse forming means for being activated responsive to the amplitude of said multiphase voltage dropping below a predetermined level.

2. The voltage sensor as set forth in claim 1, wherein said trigger circuit includes:

A. a pair of transistors coupled together for alternate conduction; and

B. a resistor-capacitor network interposed between said pair of transistors for aiding in controlling the frequency that said pair of transistors conduct.

3. The voltage sensor as set forth in claim 1, wherein said electronic pulse forming includes a unijunctional transistor capable of being placed in a conducting state responsive to the charge on said capacitor reaching a predetermined level.

4. The voltage sensor as set forth in claim 1, further comprising:

A. a plurality of transformers corresponding in number to the phases of said multiphase voltage source;

B. each phase of said voltage source being coupled to a primary winding of a respective transformer; and C. said means for rectifying said multiphase alternating voltage includes rectifiers interposed between said secondary windings of said transformers and said summing circuit means for rectifying the signals passing between said transformers and said summing circuit.

5. The voltage sensor as set forth in claim 1, further comprising a test circuit coupled to the input of said trigger circuit for simulating a drop in the level of said voltage source below said predetermined level when depressed.

6. The voltage sensor as set forth in claim 1, further comprising a latching relay interposed between said electronic pulse forming circuit and said indicator means for maintaining said indicator means in an activated state after being energized.